(12) United States Patent
Young (10) Patent No.: US 6,540,536 B1
(45) Date of Patent: Apr. 1, 2003

(54) MODULAR ELECTRICAL SYSTEM KIT WITH CIRCUIT SELECTORS

(75) Inventor: Roger W. Young, Millersburg, IN (US)

(73) Assignee: Dekko Engineering, Inc., Kendallville, IN (US)

( * ) Notice: Subject to any disclaimer, the term of this patent is extended or adjusted under 35 U.S.C. 154(b) by 0 days.

(21) Appl. No.: 09/962,391

(22) Filed: Sep. 25, 2001

(51) Int. Cl.[7] ............................................. H01R 25/16
(52) U.S. Cl. ........................................................ 439/215
(58) Field of Search .......................... 174/72 A, 135; 439/215

(56) References Cited

U.S. PATENT DOCUMENTS

| | | | | |
|---|---|---|---|---|
| 2,197,897 A | | 4/1940 | Peck ............................ 173/330 |
| 3,922,478 A | | 11/1975 | Perkey ........................... 174/53 |
| 4,313,646 A | * | 2/1982 | Millhimes et al. ............ 439/215 |
| 4,775,328 A | * | 10/1988 | McCarthy .................... 439/215 |
| 4,875,871 A | | 10/1989 | Booty, Sr. et al. .......... 439/209 |
| 5,096,431 A | * | 3/1992 | Byrne ......................... 439/215 |
| 5,203,712 A | | 4/1993 | Kilpatrick et al. ........... 439/215 |
| 5,214,889 A | * | 6/1993 | Nienhuis et al. ............. 439/215 |
| 5,252,086 A | * | 10/1993 | Russell et al. ............... 439/215 |
| 5,277,609 A | * | 1/1994 | Ondrejka ..................... 439/215 |
| 5,318,454 A | | 6/1994 | Deer et al. ................... 439/215 |
| 5,336,097 A | * | 8/1994 | Williamson et al. ......... 439/215 |
| 5,503,565 A | | 4/1996 | McCoy ........................ 439/171 |
| 5,549,488 A | | 8/1996 | Berndt et al. ................ 439/680 |
| 5,562,469 A | | 10/1996 | Niehuis et al. .............. 439/275 |
| 5,755,583 A | * | 5/1998 | McCarthy .................... 439/215 |
| 5,915,984 A | * | 6/1999 | Rupert et al. ............... 439/215 |

* cited by examiner

Primary Examiner—Dean A. Reichard
Assistant Examiner—Adolfo Nino
(74) Attorney, Agent, or Firm—Taylor & Aust, P.C.

(57) ABSTRACT

A modular electrical system kit interconnects a plurality of electrical wires of a power entry to at least one electrical outlet. The modular electrical system kit includes a plurality of circuit selectors, with each circuit selector being configured for interconnecting a respective selected combination of power entry wires to the at least one electrical outlet.

29 Claims, 9 Drawing Sheets

CIRCUIT THREE
FIG.4C

CIRCUIT FOUR
FIG.4D

MODULAR ELECTRICAL SYSTEM KIT WITH CIRCUIT SELECTORS

BACKGROUND OF THE INVENTION

1. Field of the invention.

The present invention relates to a modular electrical power distribution system, and, more particularly, to such a system including modular electrical components providing for various circuit configurations.

2. Description of the Related Art.

A modular electrical power distribution system may include power entry wires, a connector assembly, at least one wiring harness and/or a channel. The modular electrical power distribution system can be connected to a modular electrical device, such as an electrical outlet. The wiring harness or channel typically includes a plurality of wires which are associated with line, neutral and ground conductors of the system. The power entry wires are connected to the electrical outlet in multiple circuitry configurations corresponding to desired circuits. For example, in one known modular electrical conductor system, a modular switch element and receptacle element are adapted for selective plug-in connection to the male and female end connectors on carrier members. The modular switch element is pre-wired internally thereof with a plurality of conductors and includes at least one, and preferably two internal switches which enable selective connection of the various internal conductors for establishing selective primary and secondary or auxiliary circuit combinations. Another of the modular components of the conductor system is a four-way connecting device of a module adapted to serve as a three-way or four-way junction for track or carrier members, as when creating a "T" or "X" circuit junction. The various modular elements may be readily interconnected and color-coded such that simplified instructions may be provided to enable an unskilled person to readily create a desired circuit.

A problem with the aforementioned modular components is that although they may facilitate an unskilled person to readily create a desired circuit, they still require utilization of wiring tools and a physical rewiring of various components to achieve the desired circuit configuration.

Another known structure used in an electrical system of house wiring provides for a basic wiring structure having a two-part conductive insert that has a cover which may be provided with adjustable and/or variable tap bars which when fitted to bridge electrical gaps allow for multiple circuitry configurations therein. A cable can have an energizable line, a ground line, and a neutral line for attaching to conductive inserts. Conductors form the energized line so that the line is interrupted and does not complete a circuit unless a tap bar or other conductor completes the gap between the circuitry. Alternatively, the cover may be manufactured with permanently positioned tap bars, and covers may be interchangeable with a variety of other covers with different configurations of tap bars so as to again provide a number of circuitry configurations.

A problem with this structure is that the elements used in the configuring of the various circuits still require rewiring by the end user prior to the utilization of a different circuitry configuration.

A kit of parts for assembly in a modular power distribution system may provide various components and/or elements required for the configuration of an electrical circuit to be used. For example, in one known power distribution system, the kit includes a junction box having an insulative housing providing at least one outlet receptacle port adapted to receive a first outlet receptacle, multiple conductors of respective output wiring cables, first electrical terminals in the outlet receptacle port and second electrical terminals in each of the output wiring ports adapted to connect electrically, respectively, to the first electrical terminals in the outlet receptacle port. The electrical contacts are adapted to mateably engage with the second electrical terminals in a second one of the output wiring ports, whereby the second outlet receptacle is electrically connected to the first electrical terminals in the outlet receptacle port.

A problem with conventional modular electrical systems kits is that the components require assembly by the end user prior to use, often necessitating wiring of various elements together to form the modular component.

What is needed in the art is a modular electrical system element which allows an end user to reconfigure electrical circuits by simply unplugging a modular component and replacing it with another modular component having a different electrical configuration, rather than rewiring the electrical receptacle or other electrical device at a workstation.

What is further needed in the art is a modular electrical systems kit which includes several pre-wired modular circuit selectors that can be interchanged by the end user to reconfigure electrical circuits to obtain the desired circuit.

SUMMARY OF THE INVENTION

The present invention provides for a modular electrical system kit with circuit selectors which allow the end user to reconfigure electrical circuits by simply unplugging a modular component and replacing it with another circuit selector having a different electrical configuration, rather than rewiring the electrical receptacle or other electrical device at a workstation. The pre-wired circuit selector is to be used to interconnect a respective selected combination of power entry wires to an electrical outlet, particularly to be used in modular wall panel assemblies or under a removable floor access panel.

The present invention provides a circuit selector which is to be used to select a subset of electrical circuits from power entry wires in an electrical power distribution system, particularly to be used in a modular wall panel assemblies or under floor electrical systems. Such a circuit selector allows the end user to reconfigure electrical circuits by simply unplugging a modular component and replacing it with one of the desired circuit, rather than rewiring the electrical receptacle or other electrical device at a workstation.

The invention comprises, in one form thereof, a modular electrical system kit for interconnecting a plurality of electrical wires of a power entry to at least one electrical outlet. The modular electrical kit includes a plurality of circuit selectors, with each circuit selector interconnecting a respective selected combination of the power entry wires to the at least one electrical outlet.

The invention comprises, in another form, a method for connecting a plurality of combinations of power entry wires to at least one electrical outlet. A plurality of circuit selectors is provided, with each circuit selector including an input and an output interconnected by a respective pre-wired circuit configuration. A selected first one of the circuit selectors is used to interconnect a respective selected first one of the combinations of power entry wires to the at least one electrical outlet. The first circuit selector is replaced with a second circuit selector to thereby interconnect a respective selected second one of the combinations of power entry wires to the at least one electrical outlet.

An advantage of the present invention is that when the end user wants to change a circuit of an electric outlet, rather than pulling out the receptacle boxes and rewiring, he simply replaces the circuit selector with another circuit selector configured with the desired circuit.

Another advantage is that the modular electrical system kit provides pre-wired circuit selectors which are keyed so that the input housing accepts an 8-wire power entry harness which is incompatible with the keyed output plug. This allows an unskilled end user to reconfigure the electrical circuits at an electrical outlet without rewiring by simply replacing the circuit selector with another circuit selector pre-wired with the desired circuit configuration.

Yet another advantage is that the modular electrical system kits include circuit selectors pre-wired and assembled in various circuit configurations which thereby allow the end user to reconfigure an electrical circuit without needing specialized knowledge or tools to assemble the modular component prior to installation within a modular electrical power distribution system.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
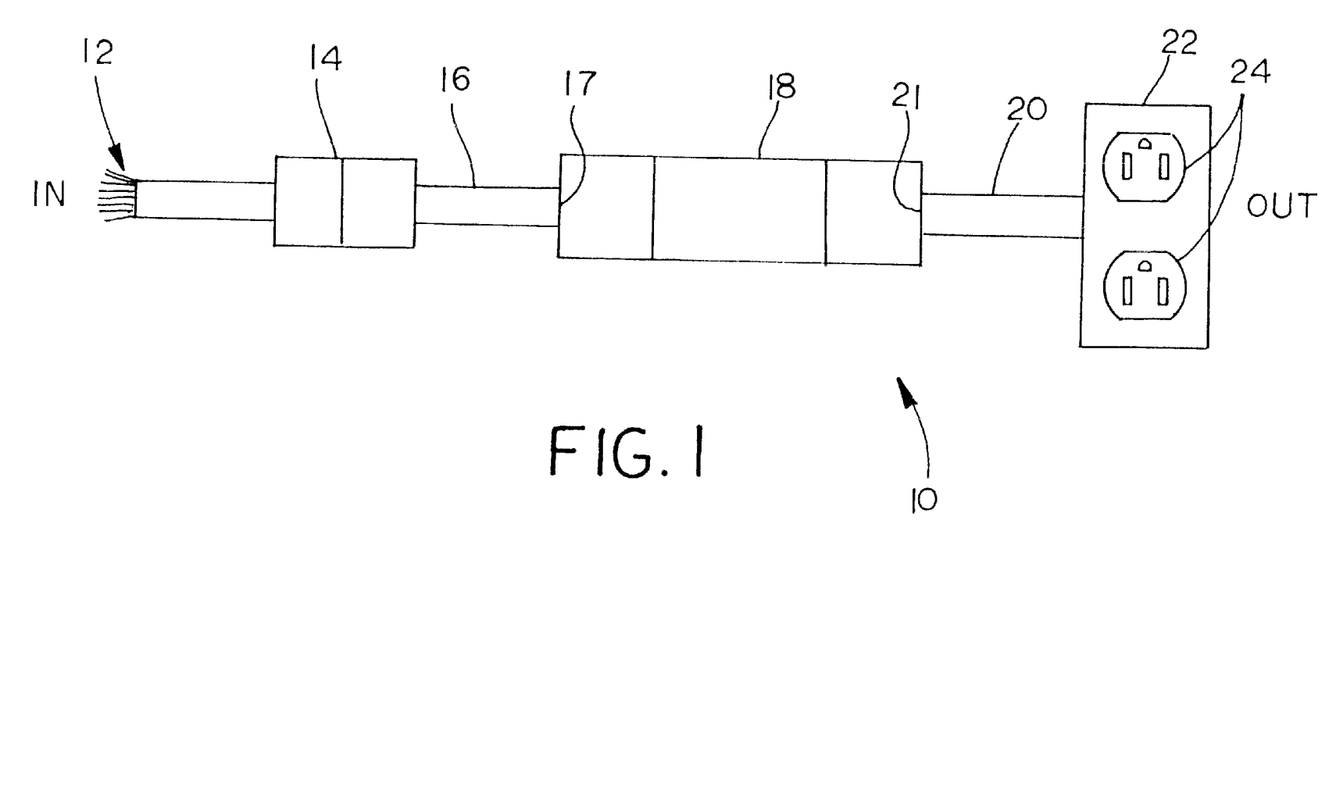
FIG. 1 is a plan front view of a modular electrical power distribution system including one embodiment of a circuit selector of the present invention;.

Referring now to the drawings, and more particularly to FIG. 1, there is shown a modular electrical power distribution system 10 which generally includes a plurality of electrical wires of a power entry 12, a connector assembly 14, a first wiring harness 16, one embodiment of a circuit selector 18 of the present invention, a second wiring harness 20 and a modular electrical device, such as a receptacle box 22 including two electrical outlets 24. Certain of power entry wires 12 may be interconnected to the receptacle box 22 in multiple circuitry configurations corresponding to desired circuits within the modular electrical power distribution system 10.

Power entry wires 12 include a plurality of electrical wires, which include line wires 26, 28, 30, 32 (FIG. 2), ground wires 34, 36, and neutral wires 38, 40. Power entry wires 12 are interconnected to the first wiring harness 16 via an eight-wire connector assembly 14. First wiring harness 16 has an eight-wire output 17, corresponding to the eight power entry wires 12, and electrically connected to circuit selector 18. Second wiring harness 20 has a three-wire input 21 electrically connected to circuit selector 18. Circuit selector 18 electrically interconnects a selected one of first wiring harness' line wires 42, 44, 46, 48, one of ground wires 50, 52, and one of neutral wires 54, 56 to second wiring harness 20 via first line conductor bar 58, first ground conductor bar 60 and first neutral conductor bar 62. More particularly, circuit selector 18 electrically interconnects line wire 42, ground wire 50 and neutral wire 54 to second wiring harness 20. That is, circuit selector 18 (FIGS. 2, 3 and 4A) is configured to electrically interconnect line wire 42, ground wire 50, and neutral wire 54 to line wire 64, ground wire 66, and neutral wire 68 of second wiring harness 20 via first line conductor bar 58, first ground conductor bar 60 and first neutral conductor bar 62.

Figure 2:
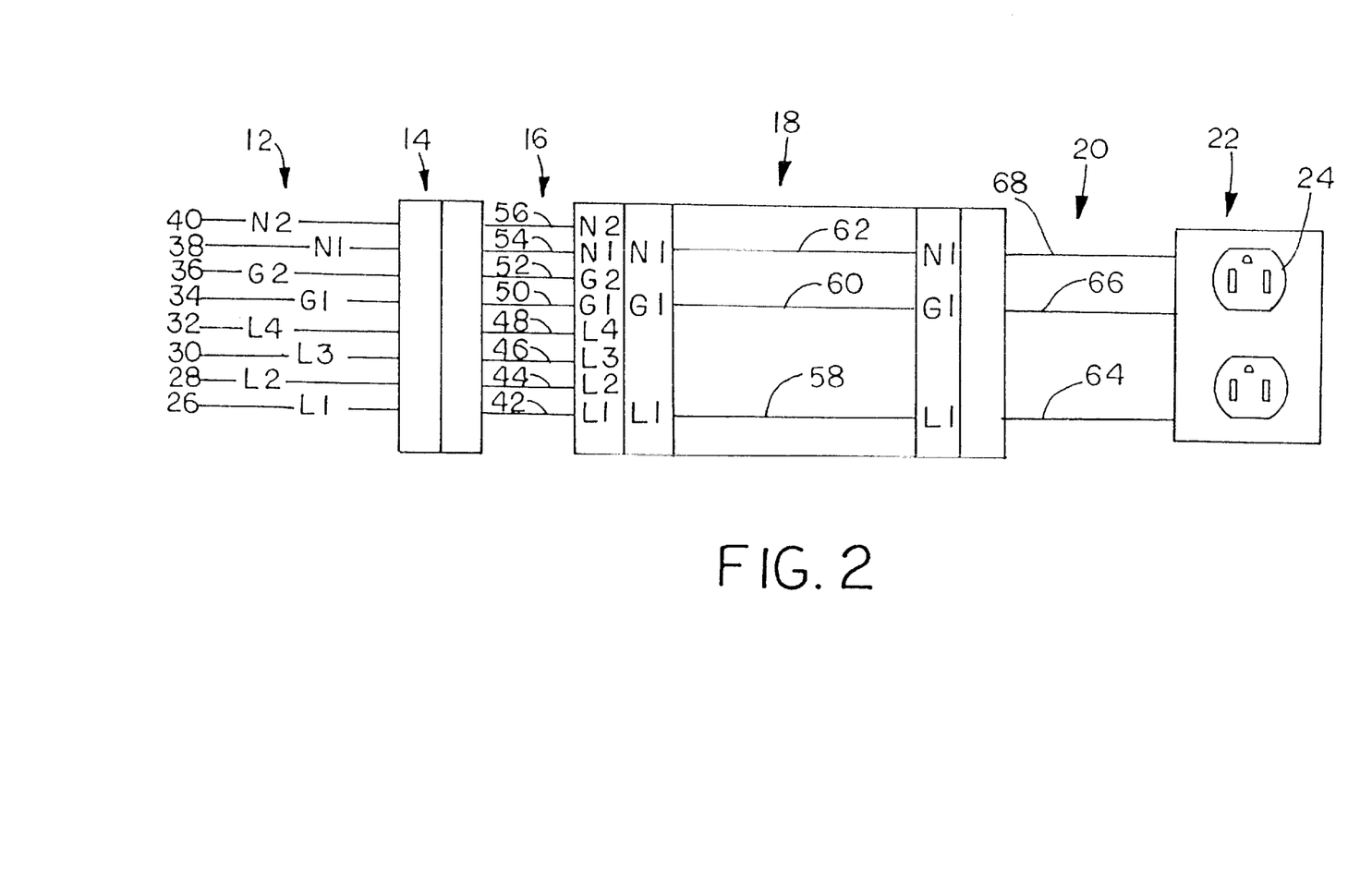
FIG. 2 is a schematic front view of the modular electrical power distribution system of Fig. 1.

The second wiring harness 20 includes line wire 64, ground wire 66 and neutral wire 68 which are associated with line conductor 58, ground conductor 60 and neutral conductor 62 of the circuit selector 18 respectively. Second wiring harness 20 electrically interconnects to each of electrical outlets 24 of receptacle box 22.

Single line circuit selector 18 includes a plug body 70 (FIG. 3), channel 74, housing body 76, spring latch 78, female input conductor terminals 80, male output conductor terminals 82, circuit identification label 86, input housing 88 and output plug 90. Input housing 88 includes eight conductor terminals 80 keyed to electrically connect to first wiring harness 16. Spring latch 78 biases harness 16 in contact with terminals 80. Conductor terminals 82 of output plug 90 are fewer in number than conductor terminals 80 of input housing 88. Output plug 90 is keyed to electrically connect to second wiring harness 20. Circuit selector 18 is a single line circuit selector configured to provide electrical connectivity for circuit one (L1, G1, N1) to receptacle box 22.

Figure 4A:
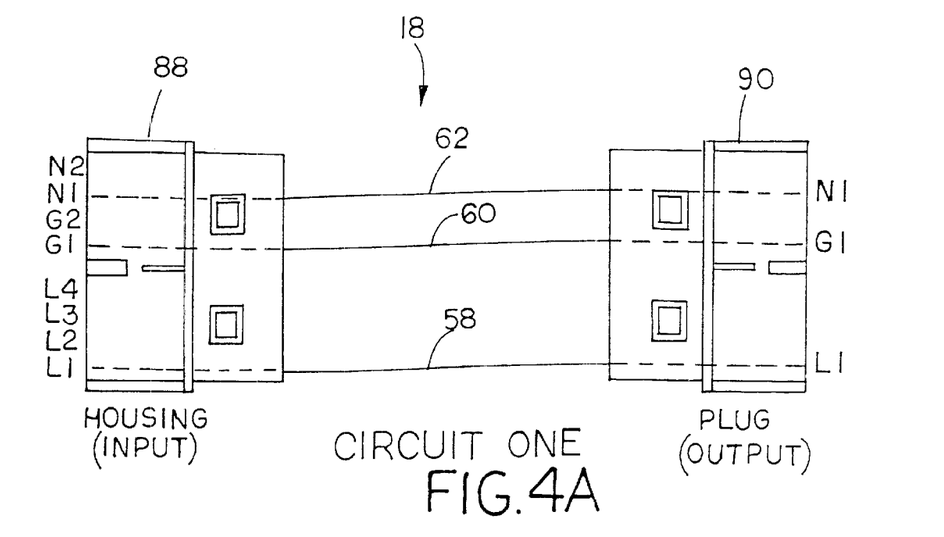
FIGS. 4A is a schematic view of the positioning of the line, ground and neutral conductor bars within the input housing and output plug of the single line circuit selector shown in FIG. 3, corresponding to circuit one.
Figure 4B:
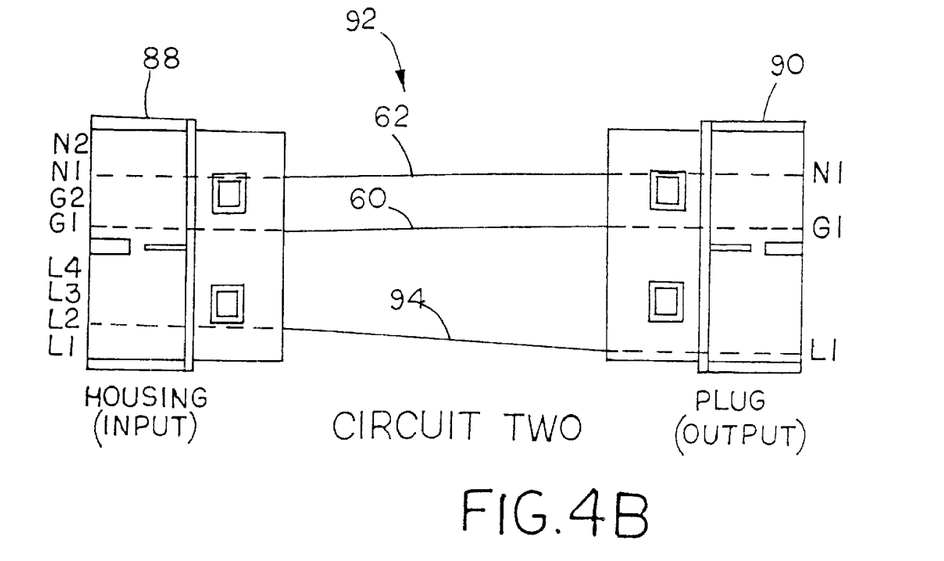
FIGS. 4B, 4C and 4D are schematic views of other embodiments of a single line circuit selector illustrating positioning of the line, ground and neutral conductor bars within the input housing and output plug corresponding to circuits two, three and four, respectively.

Another embodiment of a single line circuit selector 92 (FIG. 4B) utilizes a second line conductor bar 94 in conjunction with first ground conductor bar 60 and first neutral conductor bar 62 so as to provide electrical connectivity for circuit two (L2, G1, N1) to receptacle box 22.

Figure 4C:
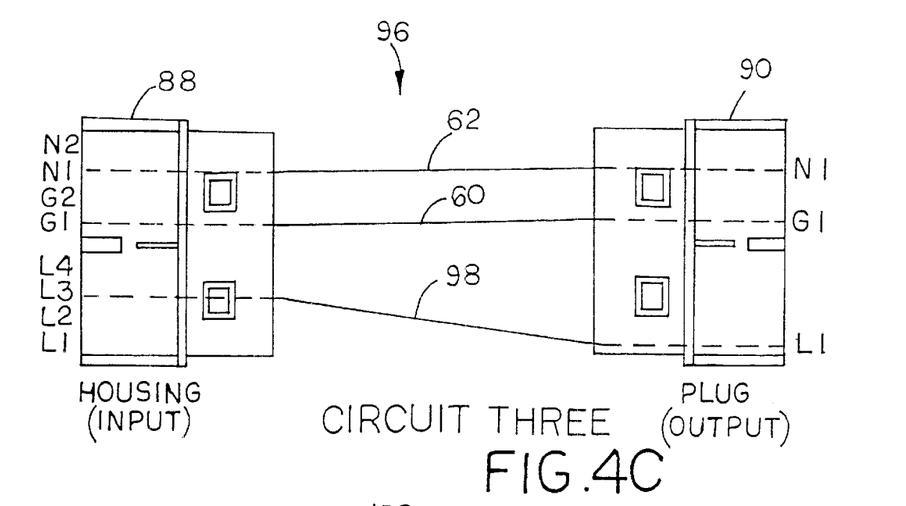

Yet another embodiment of a single line circuit selector 96 (FIG. 4C) utilizes a third line conductor bar 98 in conjunction with first ground conductor bar 60 and first neutral conductor bar 62 so as to provide electrical connectivity for circuit three (L3, G1, N1) to receptacle box 22.

Figure 4D:
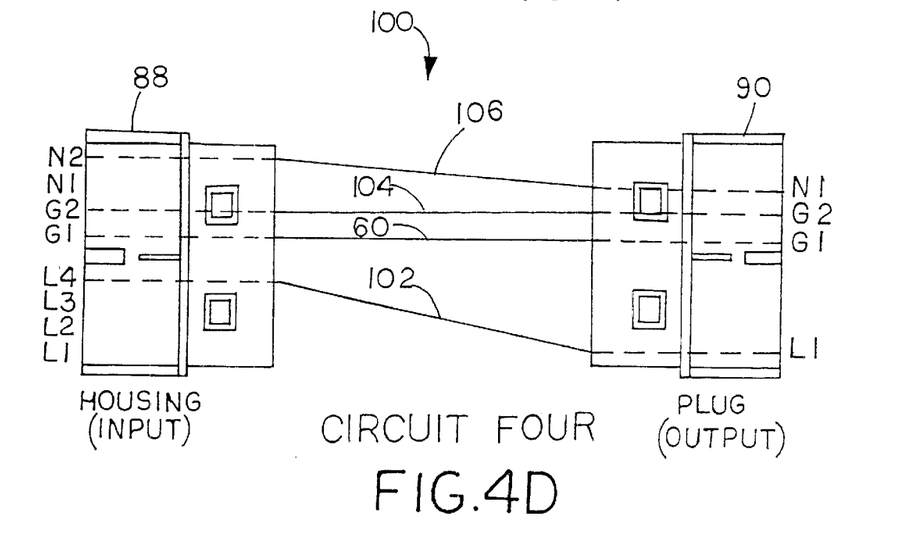

In an additional embodiment, an isolated single line circuit selector 100 (FIG. 4D) provides for an isolated circuit thereby minimizing electrical interference. Circuit selector 100 utilizes a fourth line conductor bar 102 in conjunction with first ground conductor bar 60, a second ground conductor bar 104 and a second neutral conductor bar 106. Circuit selector 100 is configured in such a way as to provide isolated electrical connectivity for circuit four (L4, G1, G2, N2) to receptacle box 22. Fourth line conductor bar 102 in conjunction with second ground conductor bar 104 and second neutral conductor bar 106 are interconnected to electrical outlets 24 via second wiring harness 20 providing an isolated circuit. A first ground circuitry including first ground wire 50 and first ground conductor bar 60 minimize electrical interference by interconnecting housing body 76 with earth ground.

A modular electrical system kit of the present invention includes a plurality of circuit selectors 18, 92, 96, 100. Each of circuit selectors 18, 92, 96, 100 is configured for interconnecting a respective selected combination of power entry wires 12 to electrical outlets 24. Each circuit selector 18, 92, 96, 100 is configured for being removed and replaced with another circuit selector to thereby interconnect another combination of power entry wires 12 to electrical outlets 24.

Figure 3:
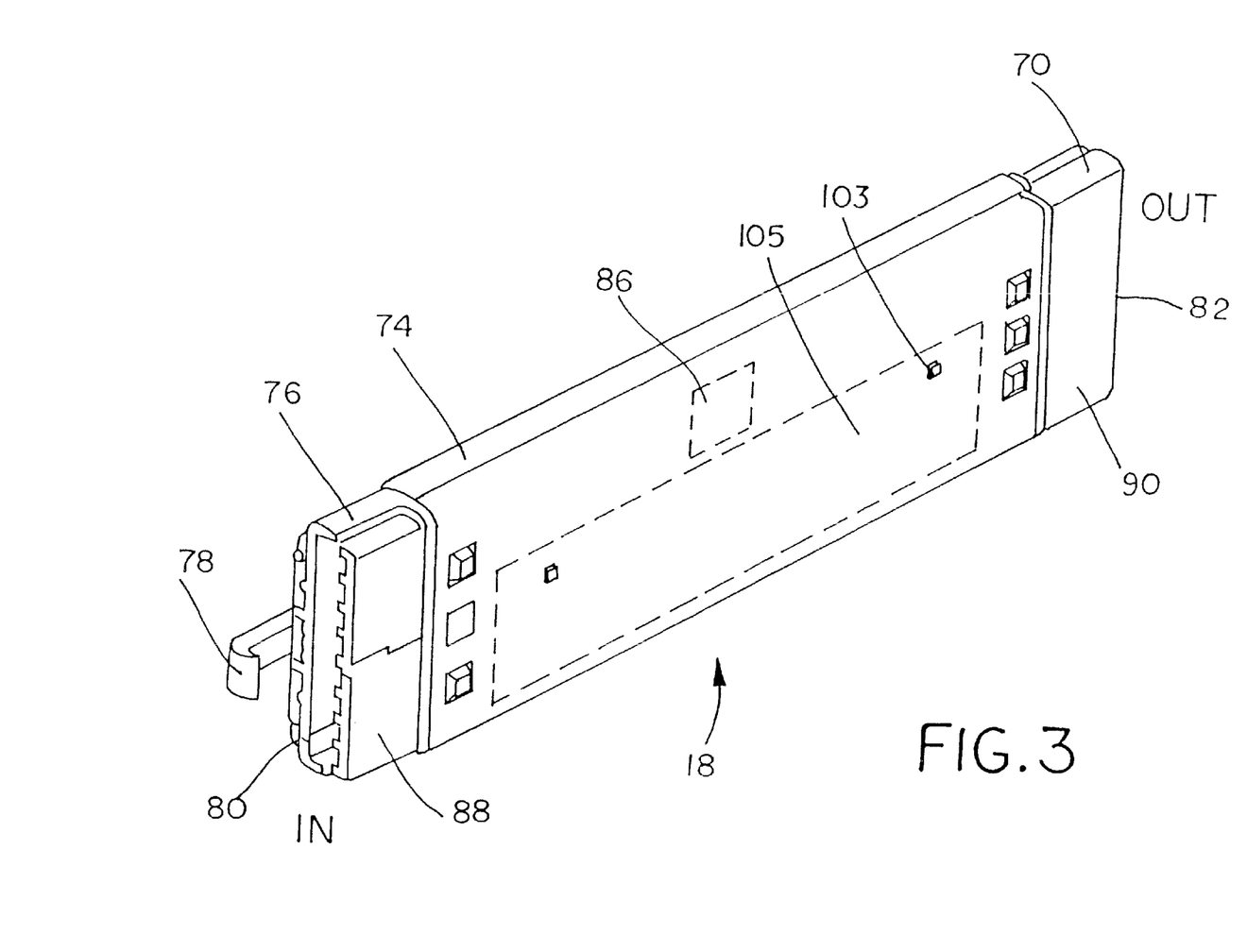
FIG. 3 is a perspective view of the single line circuit selector shown in FIG. 2.

During manufacturing, each circuit selector is pre-wired with a specific circuit configuration and closed with rivets 103. A warning label 105 is placed over rivets 103. The circuit selector is then labeled with a circuit identification label 86 which denotes which configuration of conductor bars has been assembled within housing body 76. A spring latch 78 is attached to each circuit selector to facilitate the ease in replacement. The input housing 88 of the circuit selector is keyed to include female terminals 80 which can be connected only with first wiring harness 16. The output plug 90 of the circuit selector is keyed to include male terminals 82 which can be connected only with second wiring harness 20. This assists the end user in replacing a circuit selector with another circuit selector to reconfigure the electrical circuitry at a receptacle box 22 by providing for only one possible connection orientation of the interchangeable circuit selectors.

Figure 5:
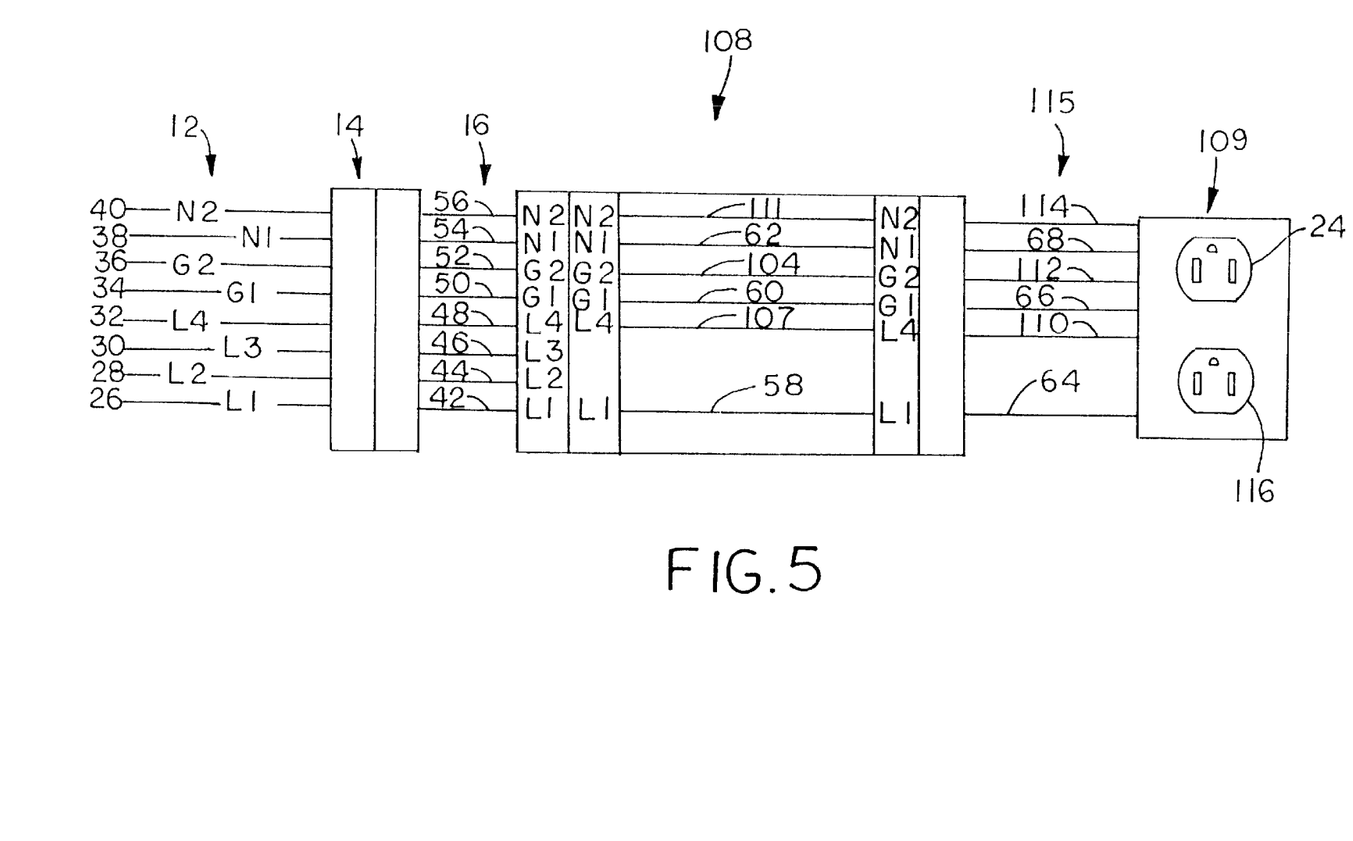
FIG. 5 is a schematic front view of another modular electrical system including another embodiment of a circuit selector of the present invention.
Figure 6:
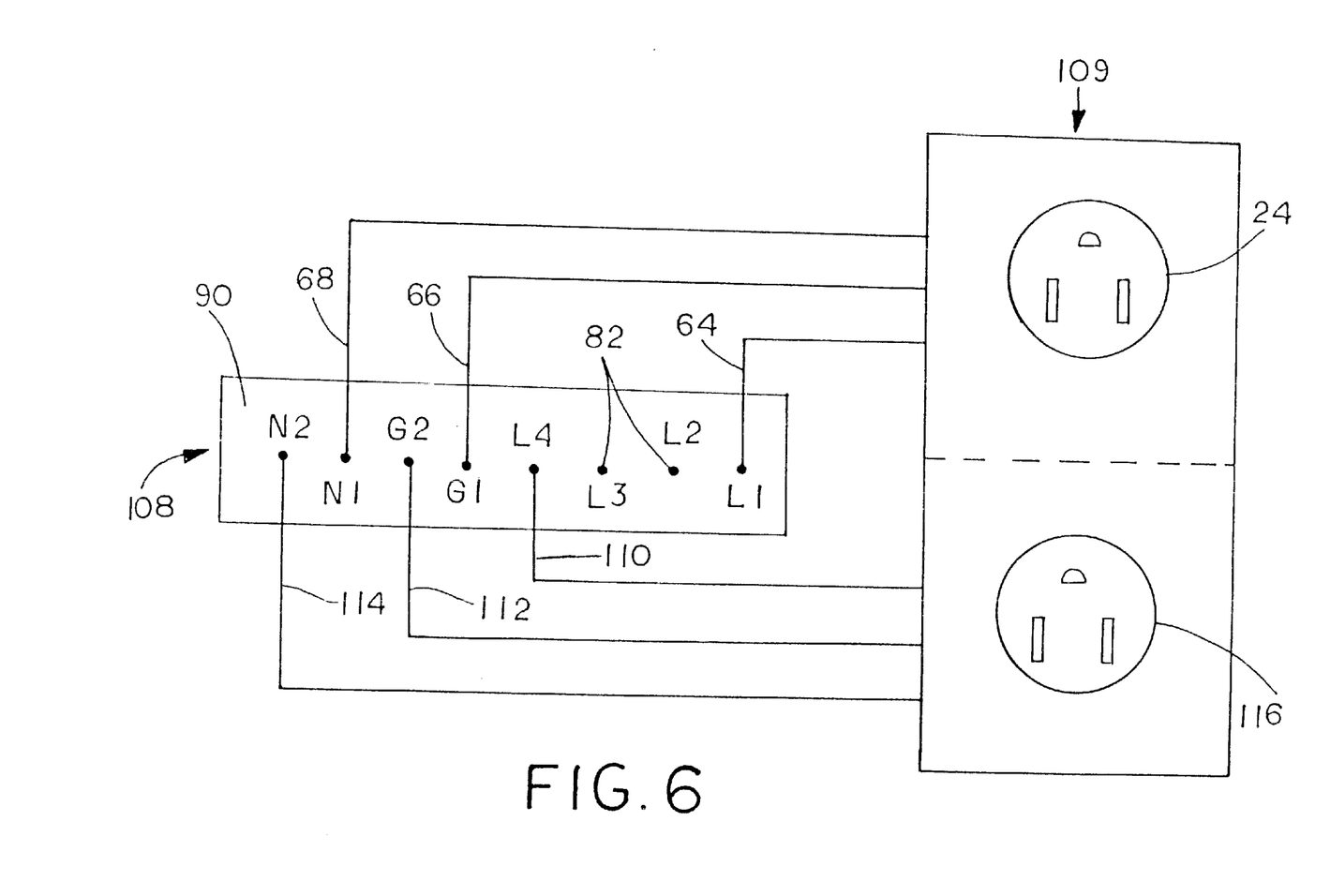
FIG. 6 is a representative schematic end view of the wiring connection between another embodiment of the circuit selector and receptacle box of FIG. 5.

Another embodiment of a circuit selector 108 (FIG. 5) provides for the use of multiple lines to connect two different electrical circuits to electrical outlets 24, 116. Power entry wires 12 include line wires 26, 28, 30, 32, ground wires 34, 36, and neutral wires 38, 40. Multiple line circuit selector 108 includes two line conductor bars 58, 107, two ground conductor bars 60, 104, and two neutral conductor bars 62, 111 which provide electrical connectivity for circuits one (L1, G1, N1) and four (L4, G1, G2, N2) to receptacle box 109. Circuits one and four are then interconnected to electrical outlets 24 and 116, respectively, as shown in FIG. 6.

Figure 7:
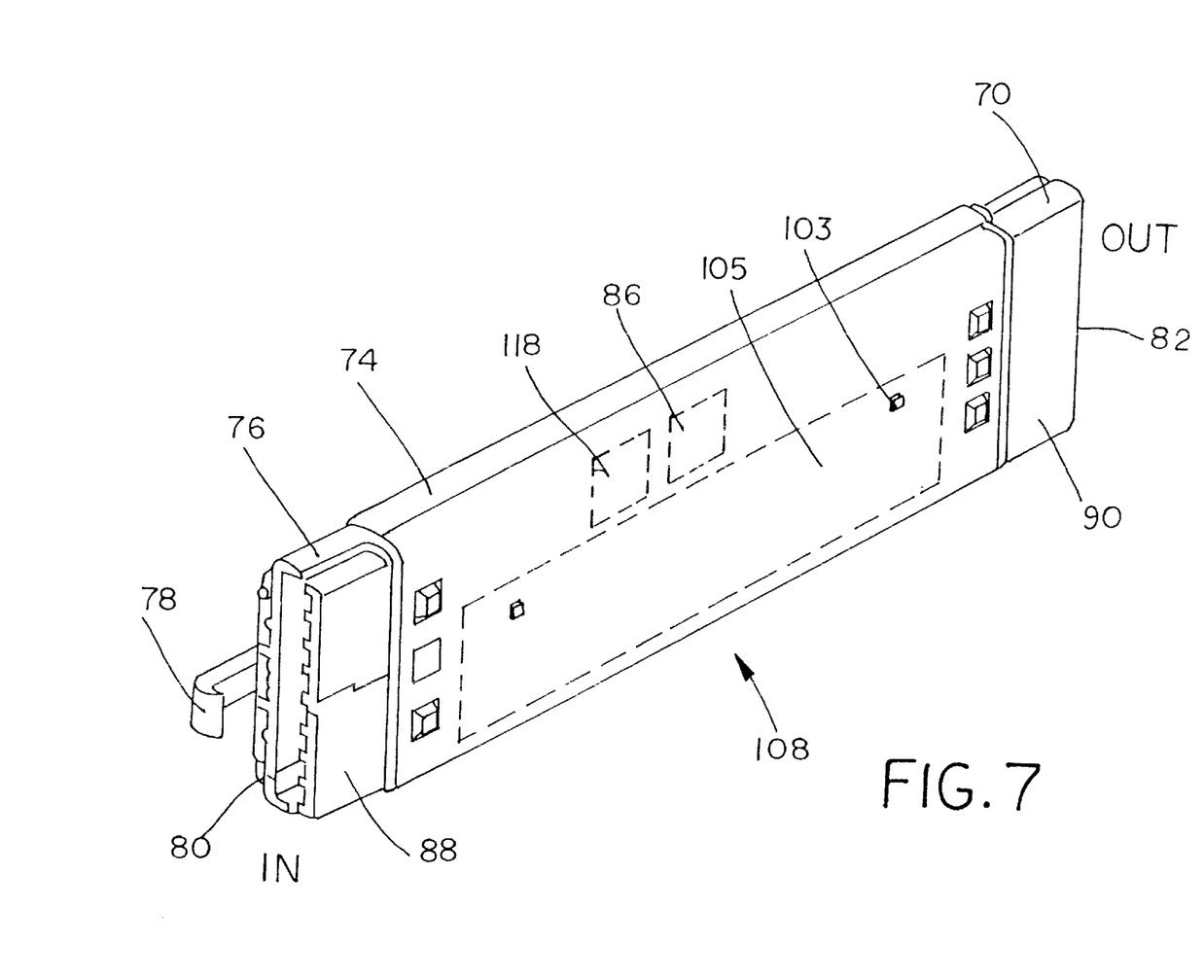
FIG. 7 is a perspective view of the multiple line circuit selector shown in FIG. 5.

Multiple line circuit selector 108 includes a plug body 70 (FIG. 7), channel 74, housing body 76, spring latch 78, female input terminals 80, male output terminals 82, circuit identification labels 86, 118, input housing 88 and output plug 90. Circuit selector 108 electrically interconnects line wires 42, 48, ground wires 50, 52, and neutral wires 54, 56 of first wiring harness 16 to line wires 64, 110, ground wires 66, 112 and neutral wires 68, 114 of second wiring harness 115 via line conductor bars 58, 107, ground conductor bars 60, 104, and neutral conductor bars 62, 111. Input housing 88 includes eight terminals 80 keyed to electrically connect to first wiring harness 16. Spring latch 78 biases harness 16 in contact with terminals 80. Terminals 82 of output plug 90 are fewer in number than terminals 80 of input housing 88. Output plug 90 is keyed to electrically connect to second wiring harness 115. Circuit selector 108 (FIG. 8A) is a multiple line circuit selector configured so as to provide electrical connectivity for circuits one (L1, G1, N1) and four (L4, G2, N2) to receptacle box 109.

Another embodiment of a multiple line circuit selector 120 (FIG. 8B) utilizes line conductor bars 94, 107 in conjunction with ground conductor bars 60, 104 and neutral conductor bars 62, 111 so as to provide electrical connectivity for circuits two (L2, G1, N1) and four (L4, G2, N2) to receptacle box 109. Yet another embodiment of a multiple line circuit selector 122 (FIG. 8C) utilizes line conductor bars 98, 107 in conjunction with ground conductor bars 60, 104 and neutral conductor bars 62, 111 so as to provide electrical connectivity for circuits three (L3, G1, N1) and four (L4, G2, N2) to receptacle box 109. Similarly to circuit selector shown in FIG. 6, the circuits may then be wired to separate electrical outlets 24, 116 within the receptacle box 109.

Figures 8A, 8B:
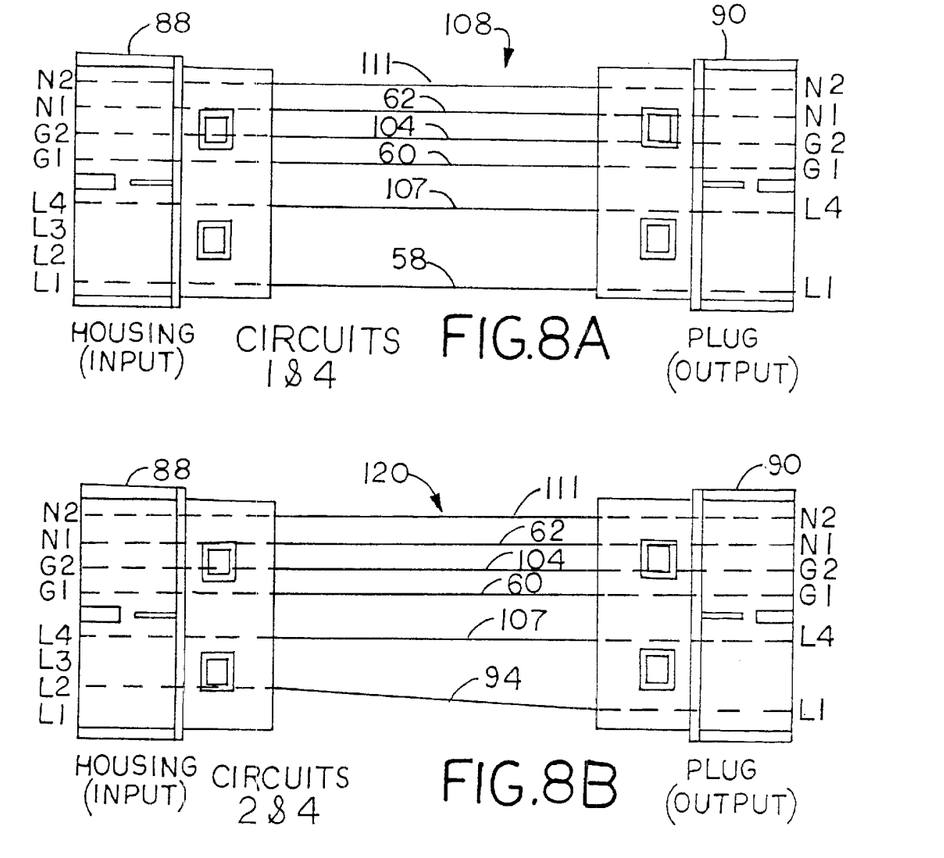
FIG. 8A is a schematic view of the positioning of the line, ground and neutral conductor bars within the input housing and output plug of the multiple line circuit selector shown in FIG. 7, corresponding to circuits one and four.
FIGS. 8B and 8C are schematic views of other embodiments of a multiple line circuit selector illustrating positioning of the line, ground and neutral conductor bars within the input housing and output plug, corresponding to circuits two and four, and three and four respectively.
Figure 8C:
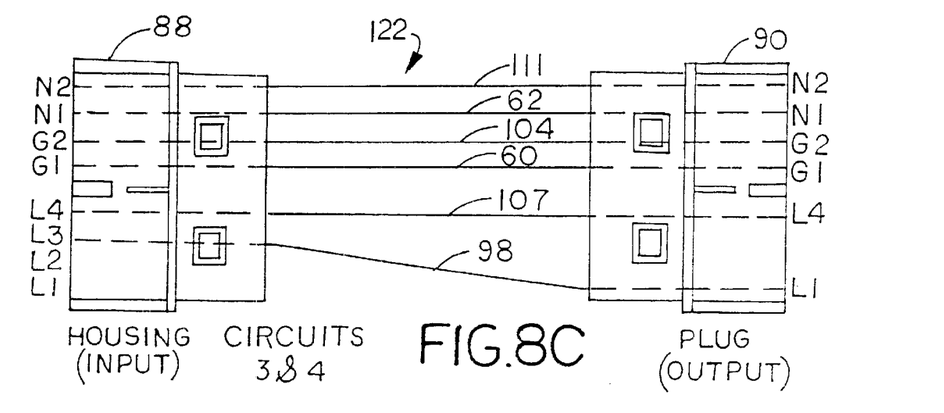

Each multiple line circuit selector is configured for electrically interconnecting two line wires, two ground wires, and two neutral wires to receptacle box 109 which includes two electrical outlets 24, 116. Multiple line circuit selectors 108, 120, 122 are configured in such a way as to provide connection not only for circuits one, two and three respectively, but also an isolated electrical connectivity for circuit four to receptacle box 109. Each of the two circuits is connected to one of electrical outlets 24, 116 at receptacle box 109. The isolated circuit may be denoted at the receptacle box 109. Examples of denotation may include utilizing an orange colored electrical outlet 24 or placing an orange triangle next to the electrical outlet 24. Any of the multiple line circuit selectors 108, 120, 122 can be replaced by any other multiple line circuit selector 108, 120, 122.

During manufacturing, each multiple line circuit selector 108, 120, 122 is pre-wired with a specific circuit configuration and closed with rivets 103. A warning label 105 is placed over rivets 103. A spring latch 78 is attached to each circuit selector to facilitate the ease in replacement. Multiple line circuit selectors 108, 120, 122 are then labeled with two circuit identification labels 86, 118 which denote the configuration of conductor bars which have been assembled within housing body 76. The input housing 88 of the circuit selector is keyed to include female terminals 80 which can be interconnected only with first wiring harness 16. Output plug 90 of the circuit selector is keyed to include male terminals 82 which can be interconnected only with second wiring harness 115.

This manufacturing process assists the end user in replacing a circuit selector with another appropriate circuit selector to reconfigure the electrical circuitry at a receptacle box 109 by providing labeled circuit selectors having only one possible mode of connection within modular electrical power distribution system 10. A single line circuit selector 18, 92, 96, 100 may be replaced by any other single line circuit selector. A multiple line circuit selector 108, 120, 122 may be replaced by any other multiple line circuit selector. Replacing a single line circuit selectors 18, 92, 96, 100 with multiple line circuit selectors 108, 120, 122 may be accomplished, but additional rewiring may be necessary at either the second wiring harness, the receptacle box or both.

The present invention provides circuit selectors 18, 92, 96, 100, 108, 120, 122 which are to be used to select a subset of electrical circuits from power entry wires 12 in an electrical power distribution system 10, particularly to be used in modular wall panel assemblies or under floor electrical systems. Such circuit selectors allow the end user to reconfigure electrical circuits by simply unplugging a modular component and replacing it with one of the desired circuit, rather than rewiring the electrical receptacle or other electrical device at a workstation. A distinct advantage of multiple circuit selectors 108, 120, 122 is the use of an isolated circuit which minimizes electrical interference by providing a clean ground. Isolated circuit four may be used for computers or other sensitive electrical devices.

The circuit selector of the present invention has been shown herein as being used in conjunction with a two-outlet receptacle. However, it is to be understood that the circuit selector can also be used with a four or more outlet receptacle. Similar to the two circuit connection at the two-outlet receptacle box, the isolated circuit is interconnected to one of the electrical outlets and may be denoted by an orange colored electrical outlet or placing an orange triangle next to the electrical outlet at the receptacle box. Thereby providing an outlet with an isolated circuit as well as several common circuit outlets.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A modular electrical system kit for interconnecting a plurality of electrical wires of a power entry to at least one electrical outlet, said modular electrical system kit comprising:
   a plurality of circuit selectors, each of said plurality of circuit selectors being configured for interconnecting a respective selected combination of the power entry wires to the at least one electrical outlet, each of said plurality of circuit selectors is configured for being removed and replaced with an other of said plurality of circuit selectors to thereby interconnect an other said combination of the power entry wires to said at least one electrical outlet.

2. The kit of claim 1, wherein each said circuit selector has an input and an output, said input being configured for being electrically connected to a first harness electrically connected to the power entry, said output being configured for being electrically connected to a second harness electrically connected to the at least one electrical outlet.

3. The kit of claim 2, wherein said second harness carries fewer electrical conductors than said first harness.

4. The kit of claim 3, wherein said plurality of electrical wires of the power entry include at least one line wire, at least one ground wire, and at least one neutral wire, each of said plurality of circuit selectors being configured for electrically interconnecting at least one said line wire, at least one said ground wire, and at least one said neutral wire to said at least one electrical outlet.

5. The kit of claim 4, wherein each said circuit selector has a plurality of conductors including at least one line conductor, at least one ground conductor, and at least one neutral conductor, each said line conductor being configured for electrically interconnecting at least one respective said line wire to said at least one electrical outlet, each said ground conductor being configured for electrically interconnecting at least one respective said ground wire to said at least one electrical outlet, and each said neutral conductor being configured for electrically interconnecting at least one respective said neutral wire to said at least one electrical outlet.

6. The kit of claim 5, wherein said plurality of conductors includes at least one conductor bar.

7. The kit of claim 3, wherein said plurality of electrical wires of the power entry include at least two line wires, at least two ground wires, and at least two neutral wires, each of said plurality of circuit selectors being configured for electrically interconnecting at least one said line wire, at least one said ground wire, and at least one said neutral wire to said at least one electrical outlet.

8. The kit of claim 7, wherein said at least one electrical outlet comprises a plurality of outlets.

9. The kit of claim 8, wherein at least a first one of said outlets is electrically connected to a first of said line wires, at least a second one of said outlets being electrically connected to a second of said line wires.

10. The kit of claim 3, wherein said plurality of electrical wires of the power entry include a plurality of line wires, a plurality of ground wires, and a plurality of neutral wires, each of said plurality of circuit selectors being configured for electrically interconnecting at least two said line wires, at least two said ground wires, and at least two said neutral wires to said at least one electrical outlet.

11. The kit of claim 4, wherein each said circuit selector has a plurality of conductors including at least two line conductors, at least two ground conductors, and at least two neutral conductors, each said line conductor being configured for electrically interconnecting at least one respective said line wire to said at least one electrical outlet, each said ground conductor being configured for electrically interconnecting at least one respective said ground wire to said at least one electrical outlet, and each said neutral conductor being configured for electrically interconnecting at least one respective said neutral wire to said at least one electrical outlet.

12. A modular electrical system kit for interconnecting a plurality of wires of a power entry to at least one electrical outlet, said modular electrical system kit comprising:
   a plurality of circuit selectors, each of said plurality of circuit selectors having a respective pre-wired characteristic circuit configuration configured for connecting a respective selected combination of the power entry wires to said at least one electrical outlet, each of said plurality of circuit selectors is configured for being removed and replaced with an other of said plurality of circuit selectors to thereby interconnect an other said combination of the power entry wires to said at least one electrical outlet.

13. The circuit selector of claim 12, wherein each of said plurality of circuit selectors is interchangeable with at least one other of said plurality of circuit selectors.

14. The kit of claim 12, wherein each of said plurality of circuit selectors has an input and an output, said input being configured for being electrically connected to a first harness electrically connected to the power entry, said output being configured for being electrically connected to a second harness electrically connected to the at least one electrical outlet.

15. The kit of claim 14, wherein said first harness carries a first number of electrical conductors, said second harness carries a second number of electrical conductors, said second number being fewer than said first number.

16. The kit of claim 15, wherein said plurality of electrical wires of the power entry include at least one line wire, at least one ground wire, and at least one neutral wire, each of said plurality of circuit selectors being configured for electrically interconnecting at least one said line wire, at least one said ground wire, and at least one said neutral wire to said at least one electrical outlet.

17. The kit of claim 16, wherein each said circuit selector has a plurality of conductors including at least one line conductor, at least one ground conductor, and at least one neutral conductor, each said line conductor being configured for electrically interconnecting at least one respective said line wire to said at least one electrical outlet, each said ground conductor being configured for electrically interconnecting at least one respective said ground wire to said at least one electrical outlet, and each said neutral conductor being configured for electrically interconnecting at least one respective said neutral wire to said at least one electrical outlet.

18. The kit of claim 17, wherein said plurality of conductors of said circuit selector includes at least one conductor bar.

19. The kit of claim 15, wherein said plurality of electrical wires of the power entry include at least two line wires, at least two ground wires, and at least two neutral wires, each of said plurality of circuit selectors being configured for electrically interconnecting at least one said line wire, at least one said ground wire, and at least one said neutral wire to said at least one electrical outlet.

20. The kit of claim 19, wherein said at least one electrical outlet comprises a plurality of outlets.

21. The kit of claim 20, wherein at least a first one of said outlets is electrically connected to a first of said line wires, at least a second one of said outlets being electrically connected to a second of said line wires.

22. The kit of claim 15, wherein said plurality of electrical wires of the power entry include a plurality of line wires, a plurality of ground wires, and a plurality of neutral wires, each of said plurality of circuit selectors being configured for electrically interconnecting at least two said line wires, at least two said ground wires, and at least two said neutral wires to said at least one electrical outlet.

23. The kit of claim 16, wherein each of said plurality of circuit selectors has a plurality of conductors including at least two line conductors, at least two ground conductors, and at least two neutral conductors, each said line conductor being configured for electrically interconnecting at least one respective said line wire to said at least one electrical outlet, each said ground conductor being configured for electrically interconnecting at least one respective said ground wire to said at least one electrical outlet, and each said neutral conductor being configured for electrically interconnecting at least one respective said neutral wire to said at least one electrical outlet.

24. A method for connecting a plurality of combinations of power entry wires to at least one electrical outlet, said method comprising the steps of:

providing a plurality of circuit selectors, each of said plurality of circuit selectors including an input and an output interconnected by a respective pre-wired circuit configuration;

using a selected first one of said circuit selectors to interconnect a respective selected first one of the combinations of power entry wires to the at least one electrical outlet; and replacing said first circuit selector with a second said circuit selector to thereby interconnect a respective selected second one of the combinations of power entry wires to said at least one electrical outlet.

25. The method of claim 24, comprising the further steps of:

identifying a desired one of the combinations of power entry wires that is to be interconnected to said at least one electrical outlet; and ascertaining which of the circuit selectors is configured to interconnect said desired combination of power entry wires to said at least one electrical outlet, wherein said second circuit selector comprises said ascertained circuit selector.

26. The method of claim 25, comprising the further steps of:

providing a first harness to electrically interconnect said desired combination of power entry wires to said ascertained circuit selector; and providing a second harness to electrically connect said ascertained circuit selector to said at least one electrical outlet, said second harness carrying fewer electrical conductors than said first harness.

27. The method of claim 26, comprising the further step of:

electrically interconnecting at least one line wire, at least one ground wire, and at least one neutral wire of said desired combination of power entry wires to said at least one electrical outlet via said ascertained circuit selector.

28. The method of claim 26, comprising the further step of:

electrically interconnecting at least two line wires, at least two ground wires, and at least two neutral wires of said desired combination of power entry wires to said at least one electrical outlet via said ascertained circuit selector.

29. The method of claim 28, wherein said at least one electrical outlet comprises a plurality of outlets, said method comprising the further step of:

electrically interconnecting at least a first one of said outlets to a first of said line wires, at least a second one of said outlets being electrically connected to a second of said line wires.

* * * * *